United States Patent

[11] 3,615,964

| [72] | Inventor | Joseph G. Malone<br>San Marino, Calif. |
|---|---|---|
| [21] | Appl. No. | 761,090 |
| [22] | Filed | Sept. 20, 1968 |
| [45] | Patented | Oct. 26, 1971 |
| [73] | Assignee | Industrial Insulations, Inc.<br>San Gabriel, Calif. |

[54] METHOD OF FORMING CREASED FIBER GLASS BLANKET
14 Claims, 5 Drawing Figs.

[52] U.S. Cl. ................................................ 156/62.6,
65/3, 117/126, 156/209, 156/219
[51] Int. Cl. ........................................................ B32b 17/04
[50] Field of Search ............................................ 65/3;
117/126; 156/62.6, 209, 219

[56] References Cited
UNITED STATES PATENTS

| 2,770,406 | 11/1956 | Lane | 156/209 UX |
| 2,906,317 | 9/1959 | Keyes | 65/3 X |
| 3,468,096 | 9/1969 | Franz | 156/581 X |

*Primary Examiner*—Leland A. Sebastian
*Attorney*—Sellers and Brace

ABSTRACT: An apparatus and method of processing fiber glass to form a blanket of desired density and featuring areas of greater density to provide pockets and/or hinged sections of a desired size and shape. The fibers carry a sparse film of heat-cured binder material holding the fibers in desired relative positions at their points of crossover. The blanket is preferably prepared in a continuous process and, if desired, is laminated to flexible sheet material as, for example, heat-reflecting foil. The hinges formed by the invention technique are resilient and possess a pronounced memory for return to the position in which held while the binder takes a set. The resulting product has many uses including one-piece ducts and liners for a wide variety of chambers, refrigerators, furnaces, and many others.

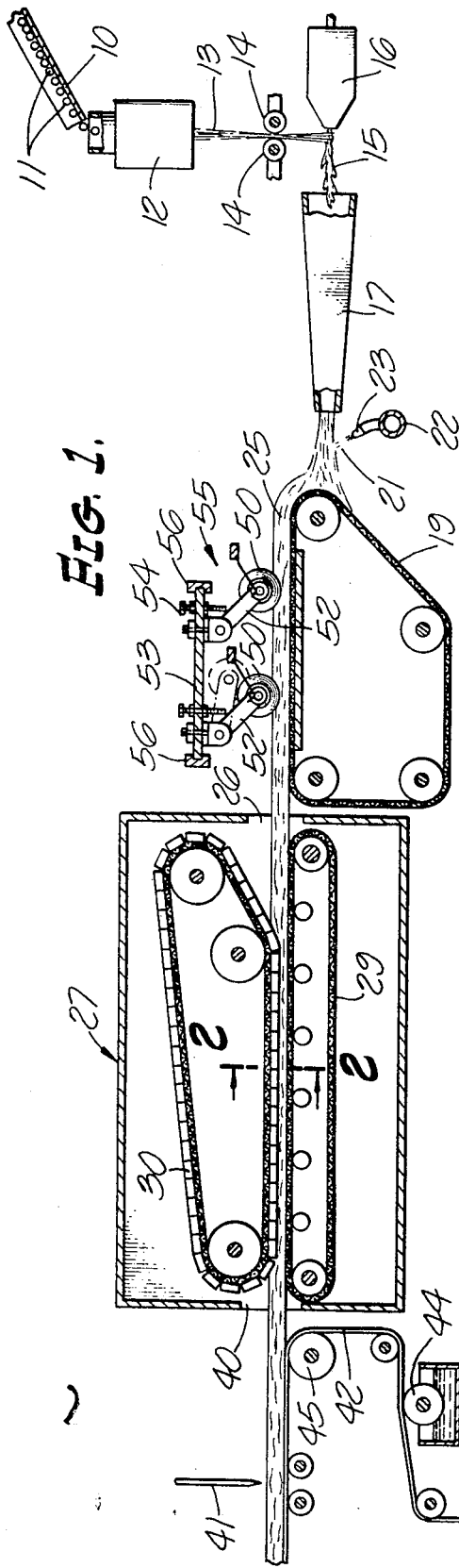
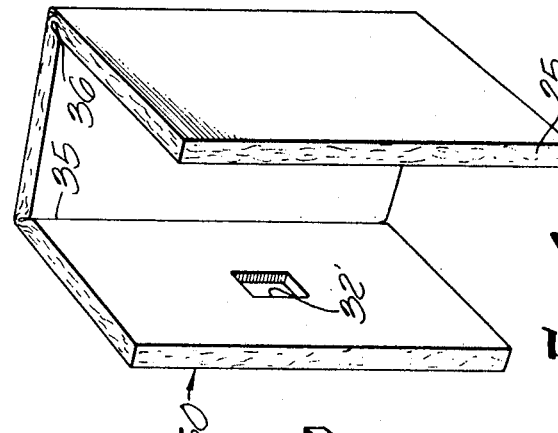
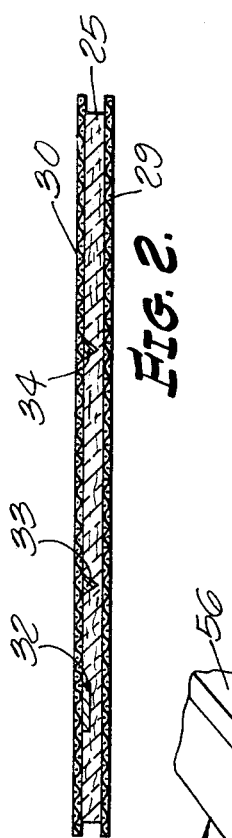
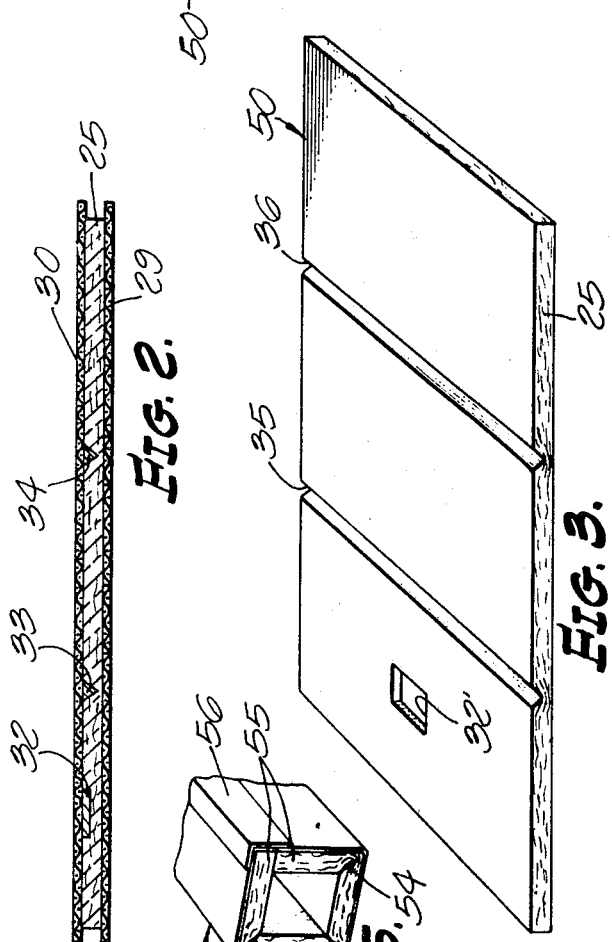
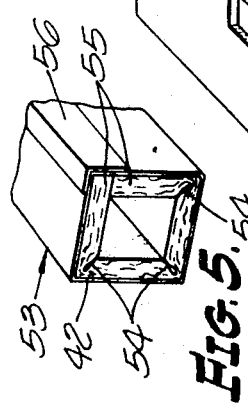
INVENTOR
JOSEPH G. MALONE
BY
ATTORNEYS

METHOD OF FORMING CREASED FIBER GLASS BLANKET

This invention relates to blankets of fiber glass and more particularly to an improved apparatus and method of making fiber glass blankets adapted to be quickly assembled into ducts and one piece liners and the like by preforming and preshaping selected areas of a fiber glass blanket.

Apparatus and techniques have been proposed heretofore for assembling fiber glass into layers or blankets of a desired thickness and density. However, such blanket material is subject to numerous disadvantages including in particular difficulties experienced in hinging, handling and installing such blankets about objects to be heat-insulated. The individual fibers have high resiliency but are so slender as to have little or no resistance to bending unless the bending forces can be applied to short lengths of the fibers. One of the particularly vexatious characteristics of this material is the difficulty experienced in attempts to fold it along a desired hinge line or to fit about obstructions, protrusions and other components adjacent the space being insulated. Substantially the only satisfactory method heretofore found for surmounting these problems involves cutting the material into small plaques or to otherwise tailor the material by hand in a fashion permitting its piecemeal assembly or installation in the operating environment.

To avoid the foregoing and numerous other shortcomings attending the use of fiber glass blankets as heretofore manufactured, there is provided by the present invention unique apparatus and a greatly improved technique for manufacturing fiber glass blankets in a continuous layer of a desired thickness and permanently preformed in any of a wide variety of configurations greatly facilitating the assembly and installation of unitary hinging plaques of the material in a place of use. A blanket of randomly arranged fibers coated sparsely with binder material is subjected to localized or general pressure and heat until the binder takes a set. V-shaped channels formed in the blanket material in this manner provide high resiliency hinges having surprising memory capabilities. Likewise cavities or depressions of any desired shape are similarly formed in the blanket during curing and so sized and positioned as to fit about some obstruction. These two illustrative types of depressions are merely exemplary of various manners in which the blanket material may be preshaped or preformed as an incident to the blanket-curing operation, the basic principle involved comprising curing uniformly distributed fiber glass in a manner to provide areas of different densities and shapes to suit varying utilitarian purposes. If desired, certain preforming operations may be performed outside an oven following which the entire blanket can be subjected to curing in an oven.

According to one preferred mode of practicing the invention, the uniformly but randomly arranged fibers with the applied binder are fed into a heating chamber while the fibers are held in a desired pattern, thickness and density following which the finished blanket may be severed into plaques of appropriate size. In a second mode, one or more narrow strips of the blanket may be preformed and subjected to curing prior to curing of other portions of the blanket and, if desired, the further curing of the preformed strips may be carried to completion in an oven along with curing of the major portions of the blanket. The blanket may also be laminated to sheet material either before or after undergoing the curing operation. The unitary plaques of the finished product may be readily flexed about preformed hinge lines for installation in the operating environment.

Accordingly, it is a primary object of the present invention to provide a new and improved apparatus and technique for manufacturing a fiber glass blanket having a desired permanent shape and configuration.

Another object of the invention is the provision of a continuous method of manufacturing a fiber glass blanket with preformed hinge lines.

Another object of the invention is the provision of an improved technique for manufacturing a continuous layer of fiber glass severable into unitary plaques each having a desired preformed shape.

Another object of the invention is the provision of an improved, inexpensive apparatus and process for manufacturing a blanket of fiber glass having uniformly distributed fibers and portions of which blanket are of greater density and resiliency and may include one or more hinges having a pronounced memory characteristic.

Another object of the invention is the provision of a novel apparatus and mode of processing a blanket of randomly and loosely arranged glass fibers in a continuous process in a manner to provide a finished product permanently preformed in a desired shape.

Another object of the invention is an improved apparatus and mode for permanently preforming selected portions of a fiber glass blanket prior to passing the blanket into an oven.

These and other more specific objects will appear upon reading the following specification and claims and upon considering in connection therewith the attached drawing to which they relate.

Referring now to the drawing in which a preferred embodiment of the invention is illustrated:

FIG. 1 is a diagrammatic view of apparatus useful in practicing the invention method;

FIG. 2 is a cross-sectional view taken along line 2—on FIG. 1;

FIG. 3 is a perspective view of a section cut from an illustrative embodiment of the product made according to this invention;

FIG. 4 is a perspective view of the parts shown in FIG. 3 folded in readiness for installation as the heat-insulating liner of an oven or refrigerator cabinet; and FIG. 5 is a fragmentary perspective view of another illustrative mode of utilizing the product made by this invention.

Referring more particularly to FIG. 1, there is represented diagrammatically suitable equipment for practicing the principles of this invention. This equipment comprises suitable means 10 supplying glass marbles 11 into a melting pot 12 is equipped in known manner with dies through which fiber glass filaments 13 are drawn by feed rollers 14. The wide stream of fibers advanced past these rollers impinges upon a wide ribbonlike flame 15 issuing from a burner 16 and then are greatly attenuated by the flame and separated into short lengths and then fed through a distributing duct 17 onto a screen conveyor 19. This belt is supported by suitable rollers and a backup plate 20 for the upper run, and is driven counterclockwise. As the multiplicity of glass fibers exit from duct 17 they pass through a spray 21 of a suitable binder supplied from a manifold 22 and distributed through spray nozzles 23. In consequence, the coated fibers readily adhere to one another to form a blanket 25 of a thickness dependent on the travel rate of conveyor 19 and the volume of fibers supplied to the conveyor.

The heat-curable binder supplied by nozzles 23 may be of any suitable type such as the various binders well known to persons skilled in the manufacture of fiber glass blankets. For example, binders in present day common use for this purpose include a single phase phenolic resin as well as emulsified silicone resin binder systems. Such systems take a set in a relatively short time in a chamber heated to a temperature ranging between 400° and 700° F. Desirably, only a sparse film of binder is supplied to the individual fibers and this is found adequate, after curing, to hold the fibers firmly fixed to one another at points of crossover with the result that the high resiliency of the fibers between points of anchorage to one or more fibers is available to impart high elasticity characteristics to the blanket assembly. The greater the blanket density, the greater its elasticity, a property which will be commented upon more fully presently.

It will be understood that the fiber blanket 25 is transferred from conveyor 19 through the entrance 26 of an oven or heated chamber 27 where the blanket is suitably preformed and the resin binder is cured. As herein shown, the means for compressing the fibers to a desired density while forming them in a particular mode comprises a lower and upper conveyor, 29, 30. Typically, both conveyors are formed of foraminous material as wire screening and either or both conveyor belts are provided with blanket shaping forms. As illustrated in FIG. 1, only upper conveyor 30 is equipped with forms 32, 33 and 34 of a size and shape necessary to shape the blanket in a desired manner. These forms may comprise the same foraminous material as the conveyor belt and are secured in place in any suitable manner. Form 32 comprises a rectangular shallow boxlike structure secured at the proper place on the outer surface of conveyor 30, whereas forms 33, 34 for forming the hinge channels 35, 36 are generally triangular in cross section. These forms are relatively short in length to facilitate their movement over the conveyor support rollers and have their abutting ends closely spaced to one another in the manner illustrated.

Chamber 27 is heated in any suitable manner and is of sufficient length to effect curing of the binder before the blanket exits through outlet opening 40. The finished blanket may pass onto a take up roller, not shown, but usually is cut into plaques or segments of a desired length by a suitably operated cutting knife 41.

It is often desirable that one or both faces of the blanket be laminated to sheet material, such as to paper or to metal foil 42. It will be understood that this laminating operation may be initiated either before the blanket enters the oven or as it exits therefrom. The heat-reflecting foil 42 or other sheet material passes from a supply roll 43 over an adhesive applying roller 44 following which it is pressed against one face of the blanket by roller 45. If the laminating layer is applied before the fiber blanket 25 enters the furnace, the resinous binder applied to the fiber glass suffices to bond sheet 42 to the blanket.

Referring now more particularly to FIGS. 3 and 4, the finished product made as described above has been severed into an individual unitary plaque 50 suitable for installation as a heat-insulating liner between the inner and outer walls of a refrigerator cabinet. In this use of the fiber glass blanket, the heat-reflecting foil is omitted since it performs no useful function. The installation of the liner can be accomplished in a matter of seconds since the installer merely grasps the opposite end sections or panels of the liner and folds them toward one another about hinges 35, 36 to the position shown in FIG. 4. The rectangular recess 32', permanently formed in the liner by form 32 (FIG. 2), is appropriately located to receive a protrusion in the inner casing of the refrigerator as, for example, the walls of the customary butter storage compartment.

The greater density of the blanket forming hinge channels 35, 36 gives these portions of the liner very pronounced resiliency owing to the highly stressed condition in which these fibers are locked by the cured binder, this resiliency tending to hold the blanket flat or in the form in which it was preformed on conveyor 29. For this reason the two end panels of the liner have a decided tendency to spread and therefore press outwardly against the cabinet side walls and tend to hold the liner firmly installed against these walls. For these reasons fastening devices for holding the liner in its installed position are quite unnecessary and may be dispensed with.

According to a variant mode of processing the fiber blanket 25 to preform the same in a permanent shape, the initial curing of preformed areas is conducted, at least through a preliminary stage, outside of oven 27. A suitable means for these purposes is indicated diagrammatically in FIG. 1 as comprising a plurality of forming rollers carried at the outer free ends of arms 52 pivoted to the underside of a mounting plate 53. The latter plate is slidable lengthwise of channel-shaped stationary supports 56. Arms 52 are spring-biased counterclockwise into engagement with the adjustable stop screws 54 in threaded openings of plate 53. It will be understood that rollers 50 may be of any desired shape to form hinge channels or channels of other shape in the blanket and are heated as by embedded electric heaters to which energy is conducted by the brush and slip ring facilities indicated at 55. Any number of heated rollers 50 may be used in alignment with one another lengthwise of blanket travel and cooperating to preform and cure the resin film on the fibers. Likewise, it will be understood that as many plates 53 may be supported for independent sliding movement lengthwise of channels 56, 56 as required to form the desired number of hinge or other channels 35, 36 in blanket 25. As is readily apparent, each of the aligned sets of rollers 50 may be adjusted to depress blanket 25 to any desired extent and quite independent of the adjustment of other of the sets of rollers.

Rollers 50 are easily adjusted and serviced while the equipment is in operation since they are fully exposed. The rollers are also readily replaced with rollers of different size or contour. Additionally, by the use of the preforming rollers just described, preformed portions of the blanket can be subjected to greater curing than other portions. In this connection it is pointed out that, if desired, forming elements 33, 34 (FIGS. 1 and 2) may be omitted when using the rollers, or they may be used in combination with rollers 50 at the user's option.

Referring to FIG. 5, there is shown another of the many modes of utilizing the blanket formed as described above. In this instance an air-conveying duct 53 is formed from a single long length of the material issuing from oven 27. Desirably, if used for either a cold or hot air duct, the blanket is provided with an outer lamination of foil or other suitably impervious lamination. Plaques made for this use are manufactured with three preformed hinges 54 and the abutting edges 55 of the duct are held snugly assembled by tape 56 coated on its inner side with a binder such as a pressure-sensitive adhesive.

While the particular apparatus and method for making heat-insulating product herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. That method of forming a blanket of fiber glass having at least one preformed resilient hinge having a pronounced memory capability and along the axis of which the blanket can be readily folded, said method comprising forming a blanket of randomly arranged short lengths of fiber glass coated with heat-curable binder material at their points of crossover, subjecting said blanket of binder-coated fiber glass to curing while holding said fibers compressed to a desired density and while compressing a narrow strip along at least one surface to a substantially greater degree until said binder takes a set, and subjecting the entire blanket to further curing in a heated chamber thereby to provide a finished fiber glass blanket having a hinge of compressed fiber glass to facilitate folding said blanket therealong.

2. That method defined in claim 1 characterized in the steps of forming a plurality of said memory hinges along a surface of said blanket by holding a plurality of narrow strips of the binder-coated fiber glass compressed while heating the binder material along said narrow strip to cure the same and hold the fibers along said strips permanently deformed.

3. That method defined in claim 2 characterized in the stop of supporting said blanket from the opposed faces thereof while advancing the same through said heated chamber, and severing said blanket into shorter sections extending crosswise of said hinges.

4. That method defined in claim 1 characterized in the step of laminating a strip of thin flexible sheet material to one surface of the fiber glass blanket to form a continuous striplike blanket of laminated material having a preformed hinge of more densely compressed fiber glass extending along and bonded to one surface thereof.

5. That method defined in claim 1 characterized in the step of passing said blanket and uncured binder between a pair of conveyor belts at least one of which is shaped to hold a narrow strip of said blanket more densely compressed than the portion to either side of said narrow strip.

6. That method defined in claim 5 characterized in the step of utilizing conveyor belts of foraminous material to facilitate heating, venting and curing of said binder material.

7. That method of processing fiber glass to form a unitary heat-insulating blanket of generally uniform density except for narrow strips of higher density fiber glass forming permanent resilient hinges having a pronounced memory capability, said method comprising: distributing filaments of fiber glass coated with uncured resinous binder randomly over conveyor means to a desired uniform depth while advancing completed portions thereof through a heated chamber, pressing the opposite faces of said blanket to compress the fibers to a desired density and including compressing at least a narrow channel of said fibers to a substantially greater density to form a hinge, and holding said fibers compressed as aforesaid while said resinous binder takes a set.

8. That method defined in claim 7 characterized in the step of forming at three resilient hinges in said blanket lying parallel to one another whereby the blanket issuing from said heated chamber at the conclusion of the curing step is adapted to be folded along said hinges into a duct or the like-appearing assembly.

9. That method defined in claim 8 characterized in the step of bonding a sealing strip across the abutting lateral edges of said blanket when folded into a duct thereby to hold the same in assembled condition.

10. That method defined in claim 8 characterized in bonding impervious flexible sheet material to one entire surface of said blanket.

11. That method defined in claim 8 characterized in the step of laminating heat-reflective foil to the surface of said blanket remote from said hinge-forming channels, forming a duct of said blanket by folding the same along the axes of said hinges, and bonding a sealing strip of impervious tape across the abutting lateral edges of said duct to form a duct.

12. That method defined in claim 7 characterized in the step of forming at least two resilient parallel hinges in said blanket spaced to form a one-piece heat-insulating liner for the sides and rear wall of a refrigerator cabinet.

13. That method defined in claim 12 characterized in the step of compressing said blanket of a selected area and a desired size and configuration while heat-curing said resinous binder material thereby to provide a finished blanket product having permanent hinges and a depressed pocket opening through one face of the blanket.

14. That method of forming a blanket of fiber glass having a greater density size and shape in certain areas thereof, said method comprising distributing filaments of fiber glass randomly upon a support thereof and bearing a sparse film of uncured resinous binder to provide a blanket assembly of uniform density, heating said blanket assembly while applying greater pressure to a selected area thereof than to other portions of said blanket assembly thereby to increase the density of the fibers thereabout, and holding the fibers so compressed until said binder takes a set thereby to form a resilient porous blanket having a permanent cavity of a desired shape and size opening through one surface of the blanket.

* * * * *

UNITED STATES PATENT OFFICE
CERTIFICATE OF CORRECTION

Patent No. 3,615,964   Dated October 26, 1971

Inventor(s) Joseph G. Malone

It is certified that error appears in the above-identified patent and that said Letters Patent are hereby corrected as shown below:

Column 6, line 26, after "fibers", first occurrence, insert -- in said area substantially over the density of the fibers --.

Signed and sealed this 29th day of August 1972.

(SEAL)
Attest:

EDWARD M. FLETCHER, JR.
Attesting Officer

ROBERT GOTTSCHALK
Commissioner of Patents